United States Patent
Lee et al.

(10) Patent No.: US 7,933,403 B2
(45) Date of Patent: Apr. 26, 2011

(54) ARIA ENCRYPTION/DECRYPTION APPARATUS AND METHOD, AND METHOD OF GENERATING INITIALIZATION KEY FOR THE SAME

(75) Inventors: Sang Woo Lee, Daejeon (KR); Yong Sung Jeon, Daejeon (KR); Ki Young Kim, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1175 days.

(21) Appl. No.: 11/634,480

(22) Filed: Dec. 6, 2006

(65) Prior Publication Data

US 2007/0177728 A1 Aug. 2, 2007

(30) Foreign Application Priority Data

Dec. 9, 2005 (KR) .................. 10-2005-0121031

(51) Int. Cl.
*H04L 9/06* (2006.01)
(52) U.S. Cl. .................. 380/28; 380/37; 380/44
(58) Field of Classification Search .................. None
See application file for complete search history.

(56) References Cited

FOREIGN PATENT DOCUMENTS

| JP | 2004-153733 | 5/2004 |
|---|---|---|
| KR | 1020000037698 | 7/2000 |

OTHER PUBLICATIONS

Kwon et al., New Block Cipher: ARIA, 2004.*
Specification of ARIA, National Security Research Institute, Jan. 2005.*

* cited by examiner

*Primary Examiner* — Minh Dinh
(74) *Attorney, Agent, or Firm* — Ladas & Parry LLP

(57) ABSTRACT

Disclosed is an Academy, Research Institute, and Agency (ARIA) encryption/decryption apparatus for encrypting and decrypting input data by repeating a plurality of rounds. The ARIA encryption/decryption apparatus includes a first register storing input data or an intermediate calculation value according to a first control signal; a second register storing a input round key for every round; an exclusive OR operation unit performing an exclusive OR operation on values stored in the first and second registers; a substitution unit substituting a result of the exclusive OR operation on a basis of an ARIA substitution algorithm; a diffusion unit diffusing a result of the substitution in the substitution unit on a basis of an ARIA diffusion algorithm if a current round is not a final round; and a control unit outputting the first control signal so that an output of the diffusion unit is used as the intermediate calculation value if the current round is the final round or an output of the substitution unit is used as the intermediate calculation value if the current round is the final round, and outputting an output of the exclusive OR operation unit as a result of the ARIA encryption/decryption.

9 Claims, 5 Drawing Sheets

ARIA ENCRYPTION/DECRYPTION APPARATUS AND METHOD, AND METHOD OF GENERATING INITIALIZATION KEY FOR THE SAME

CROSS-REFERENCE TO RELATED PATENT APPLICATION

This application claims the benefit of Korean Patent Application No. 10-2005-0121031, filed on Dec. 9, 2005, in the Korean Intellectual Property Office, the disclosure of which is incorporated herein in its entirety by reference.

BACKGROUND OF THE INVENTION

1. Field of the Invention

The present invention relates to an Academy, Research Institute, and Agency (ARIA) encryption apparatus and method and a method of generating an initialization key for the same, and more particularly, to an aria encryption apparatus and method in which a key initialization and a round operation are performed in a single device, and a method of generating an initialization key for the same.

2. Description of the Related Art

An ARIA algorithm is a symmetric key block cipher algorithm that has been developed by the Korean National Security Research Institute for the public and private use.

In the ARIA algorithm, it is recommended that the number of rounds performed is 12 for 16 byte length key, 24 for 24 byte length key, and 16 for 32 byte 25 length key.

In the ARIA algorithm, encryption is performed by a round operation, and each round includes a substitution operation and a diffusion operation. Performances of such substitution and diffusion operations depend on a hardware resource type and a time period required for the ARIA block encryption.

A conventional ARIA encryption apparatus should have a key initialization circuit separated from a device for performing the round operation. For this reason, a hardware size of the ARIA encryption apparatus inevitably increases. This causes a difficulty in mounting the conventional ARIA encryption apparatus on mobile terminals such as personal digital assistants (PDAs) or hardware-size-limited devices such as smart cards.

SUMMARY OF THE INVENTION

The present invention provides an Academy, Research Institute, and Agency (ARIA) encryption apparatus and method, and a method of generating an initialization key for the same, in which a hardware size is reduced by performing both a key initialization operation and a round operation in a single unit without providing separate devices for them.

According to an aspect of the present invention, there is provided an ARIA encryption/decryption apparatus for encrypting and decrypting input data by repeating a plurality of rounds, the ARIA encryption/decryption apparatus including: a first register storing input data or an intermediate calculation value according to a first control signal; a second register storing a input round key for every round; an exclusive OR operation unit performing an exclusive OR operation on values stored in the first and second registers; a substitution unit substituting a result of the exclusive OR operation on a basis of an ARIA substitution algorithm; a diffusion unit diffusing a result of the substitution in the substitution unit on a basis of an ARIA diffusion algorithm if a current round is not a final round; and a control unit outputting the first control signal so that an output of the diffusion unit is used as the intermediate calculation value if the current round is the final round or an output of the substitution unit is used as the intermediate calculation value if the current round is the final round, and outputting an output of the exclusive OR operation unit as a result of the ARIA encryption/decryption.

According to another aspect of the present invention, there is provided an ARIA encryption/decryption method for encrypting and decrypting input data by repeating a plurality of rounds, the ARIA encryption/decryption method including: storing input data and a first round key in first and second registers, respectively; performing an exclusive OR operation on values stored in the first and second registers; substituting a result of the exclusive OR operation according to a predetermined control signal; storing a result of the substitution in the first register and storing a next round key in the second register if a current round is a final round; and performing an exclusive OR operation on values stored in the first and second registers to output a result of the ARIA encryption/decryption.

According to still another aspect of the present invention, there is provided a method of generating an initial key for an ARIA encryption/decryption, the method including: storing a key generation key and a first key initialization constant in the first and second registers, respectively; performing a first exclusive OR operation on values stored in the first and second registers; substituting a result of the first exclusive OR operation; diffusing a result of the substitution; storing a result of the diffusion and initial keys calculated in a previous round in the first and second registers, respectively; performing a second exclusive OR operation for values stored in the first and second registers; storing a result of the second exclusive OR operation in the first and third registers and storing a next key initialization constant in the second register; repeating processes from the performing a first exclusive OR operation to the storing a next key initialization constant in the second register as many times as a number of key initialization constants; and outputting values stored in the third register as the initialization keys.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in more detail with reference to the accompanying drawings.

Figure 1:
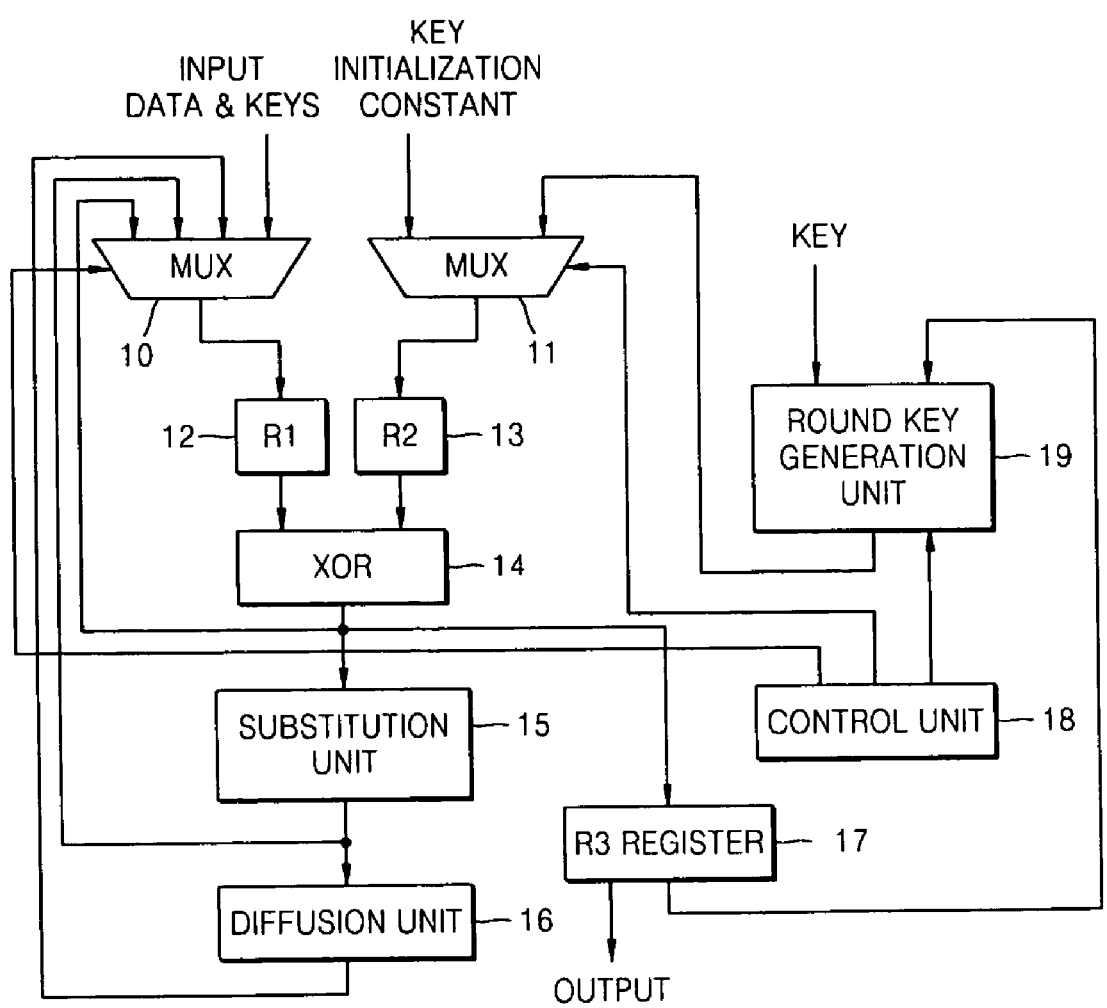
FIG. 1 is a block diagram illustrating an Academy, Research Institute, and Agency (ARIA) encryption apparatus according to an embodiment of the present invention.

FIG. 1 is a block diagram illustrating an Academy, Research Institute, and Agency (ARIA) encryption apparatus according to an embodiment of the present invention.

Since the ARIA encryption apparatus has an involution structure in which both encryption and decryption processes are the same, it should be noted that the encryption apparatus is also used as a decryption device, and vice versa. Therefore, although only an encryption apparatus is described for convenience of description, the illustrated encryption apparatus and method can be similarly applied to the decryption apparatus and method.

Referring to FIG. 1, the ARIA encryption apparatus includes first and second multiplexers (MUX) 10 and 11, first and second registers 12 and 13, an exclusive OR operation unit 14, a substitution unit 15, a diffusion unit 16, a third register 17, and a control unit 18. The ARIA encryption apparatus of FIG. 1 may further include a round key generation unit 19 for providing a round key in each round.

Figure 2:
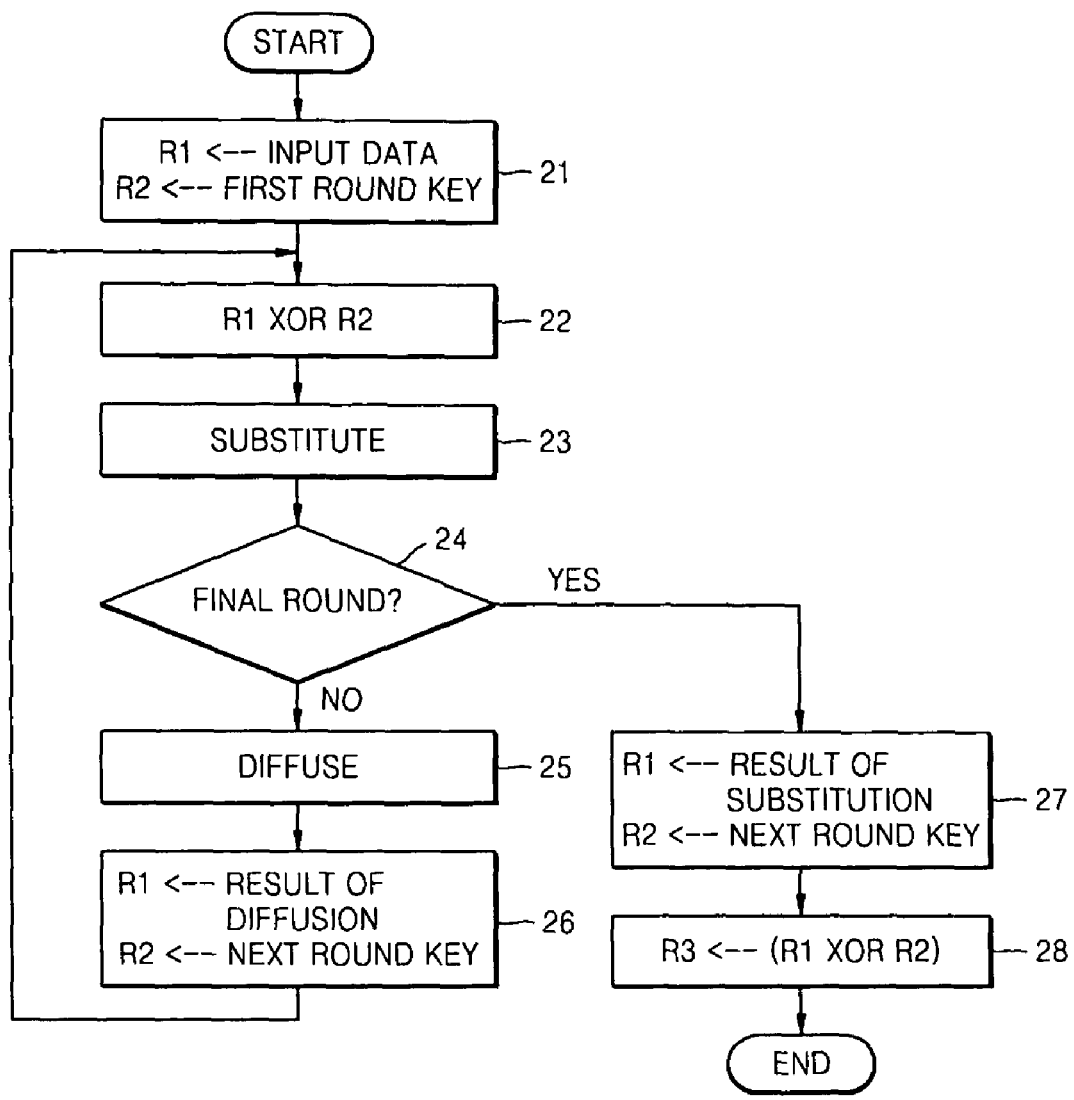
FIG. 2 is a flowchart illustrating an ARIA encryption process according to an embodiment of the present invention.

FIG. 2 is a flowchart illustrating an ARIA encryption process according to an embodiment of the present invention. Operations of the ARIA encryption apparatus of FIG. 1 will be described with reference to the flowchart of FIG. 2.

The first and second registers 12 and 13 store input data and a first round key transmitted through the first and second multiplexers 10 and 11 according to first and second control signals output from the control unit 18, respectively (operation 21).

The exclusive OR operation unit 14 performs an exclusive OR operation for the values stored in the first and second registers 12 and 13 (operation 22), and the substitution unit 15 performs a substitution operation for the result of the exclusive OR operation according to a third control signal output from the control unit 18 on the basis of a substitution method of the ARIA encryption algorithm (operation 23). The substitution method will be described later in detail.

If the current round is not the final round (operation 24), the diffusion unit 16 performs a diffusion operation on the result of the substitution on the basis of a diffusion method of the ARIA encryption algorithm (operation 25). The diffusion operation will be described later in detail.

The control unit 18 stores the result of the diffusion in the first register 12 through the first multiplexer 10 and stores the next round key in the second register 13 (operation 26), and then repeats operations 22 to 26.

If the current round is the final round, the control unit 18 stores the result of the substitution in the first register 12 and stores the next round key in the second register 13 (operation 27).

The exclusive OR operation unit 14 performs an exclusive OR operation for the values stored in the first and second registers 12 and 13 and stores the result of the exclusive OR operation in the third register 17 (operation 28). The value stored in the third register 17 becomes the result of the ARIA encryption.

Here, the first round key and the next round key are generated in each round on the basis of a key generation key MK and initialization keys w0, w1, w2 and w3 using a method disclosed in Korean Industrial Certification Standard (ICS) No. 2004-1149.

The initialization keys w0, w1, w2 and w3 are generated by the encryption apparatus illustrated in FIG. 1, using the key generation key MK and key initialization constants CK1, CK2 and CK3 that are sequentially input. In this case, the initialization key w0 is equal to the key generation key MK. Therefore, three key initialization constants CK1, CK2 and CK3 are required.

Figure 3:
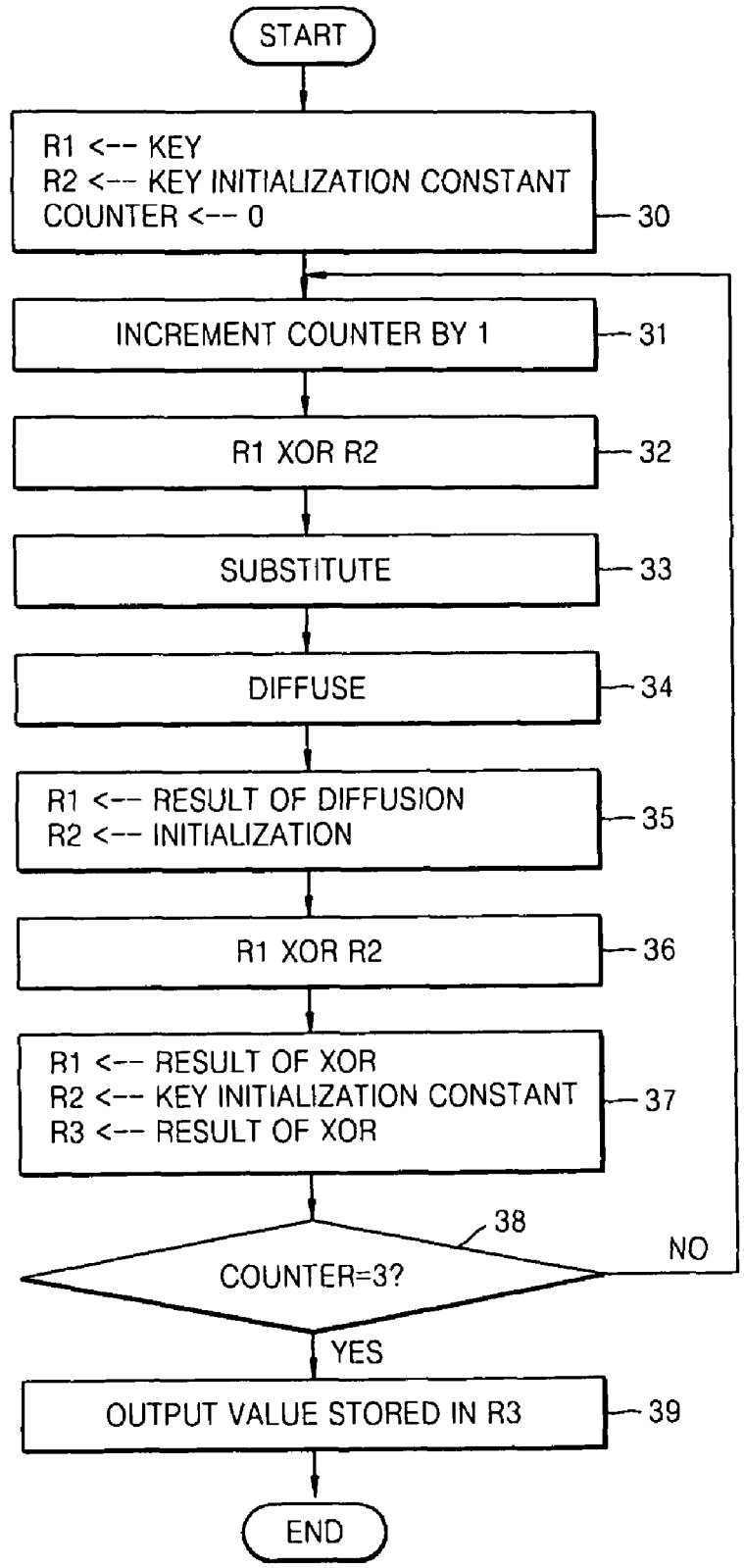
FIG. 3 is a flowchart illustrating a process of generating initialization keys.

In the ARIA algorithm, the key diffusion process includes a key initialization and round key generation processes. In the key initialization, four 16-byte initialization keys w0, w1, w2 and w3 are generated if the key generation key MK and the initialization keys CK1, CK2 and CK3 are input, FIG. 3 is a flowchart illustrating a process of generating the initialization keys.

Firstly, the key generation key MK and the key initialization constant CK1 are stored in the first and second registers 12 and 13 through the first and second multiplexers 10 and 11 according to the first and second control signals, respectively, and a counter (not shown) is set to zero (operation 30). In addition, the initialization key w0 is stored in the third register 17.

If the counter is incremented by one (operation 31), the exclusive OR operation unit 14 performs an exclusive OR operation on the values stored in the first and second registers 12 and 13 (operation 32). The substitution unit 15 performs a substitution operation for the result of the exclusive OR operation (operation 33), and the diffusion unit 16 performs a diffusion operation on the result of the substitution (operation 34). The control unit 18 stores the result of the diffusion in the first register 12 through the first multiplexer 10, and stores an initialization key set to zero in the second register 13 (operation 35).

The exclusive OR operation unit 14 performs an exclusive OR operation on the values stored in the first and second registers 12 and 13 (operation 36). The control unit 18 stores the result of the exclusive OR operation in the first register 12, and also in the third register 17 as the initialization key w1. In addition, the control unit 18 stores the key initialization constant CK2 in the second register 13 (operation 37). If the counter does not show three (operation 38), operations 31 to 37 are repeated again. If the counter shows three, the initialization keys w0, w1, w2 and w3 stored in the third register 17 are output to the round key generation unit 19 (operation 39).

The values stored in the first and second registers 12 and 13 as a result of the above processes are shown in the following table.

TABLE 1

| Counter | First register(12) | Second register(13) |
| --- | --- | --- |
| 0 | MK | CK1 |
| 1 | Result of diffusion w1 | 0 CK2 |
| 2 | Result of diffusion w2 | W0 CK3 |
| 3 | Result of diffusion w3 | W1 0 |

Figure 4:
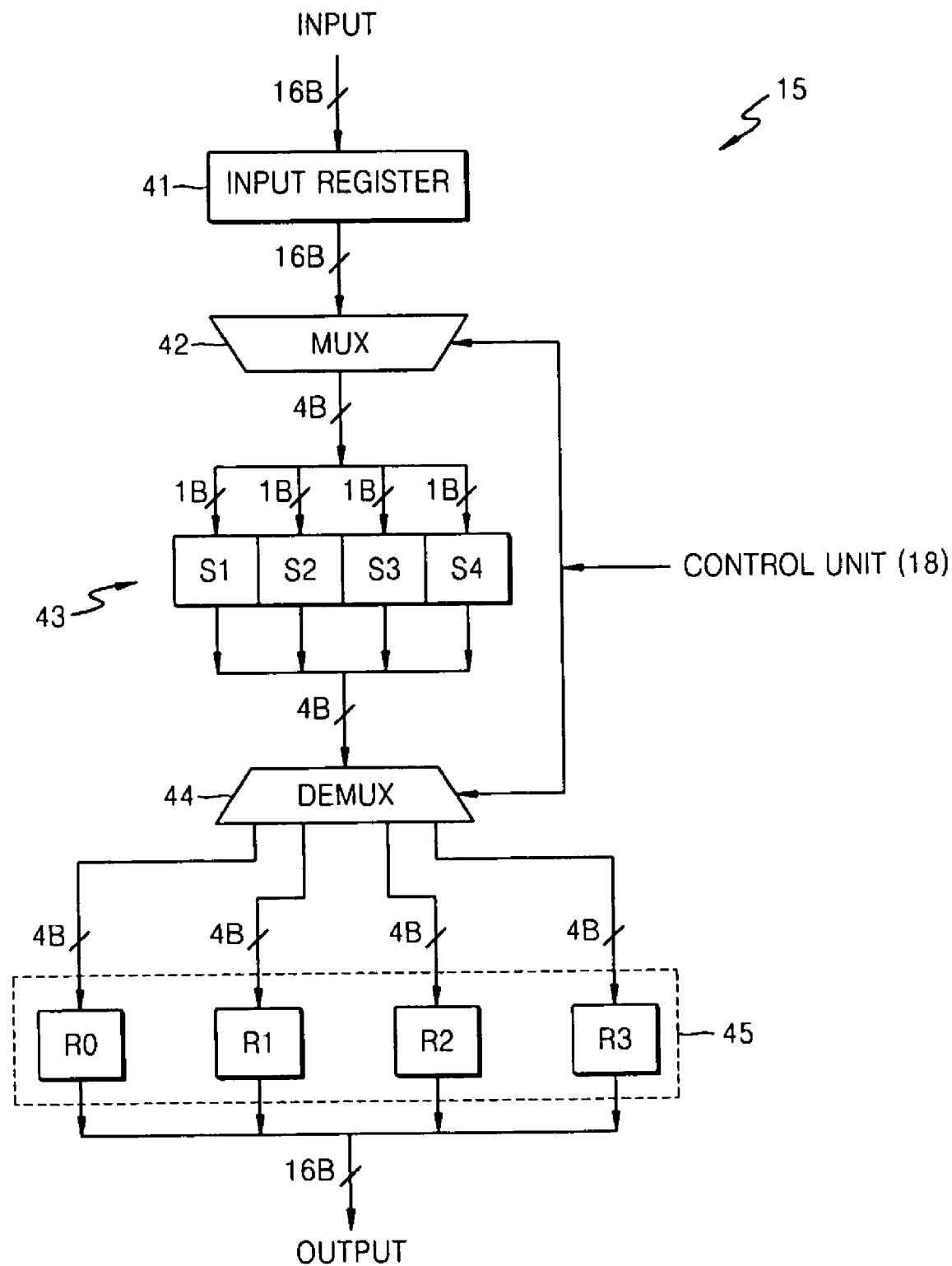
FIG. 4 is a detailed block diagram of a substitution unit illustrated in FIG. 1.

FIG. 4 is a detailed block diagram of the substitution unit 15 illustrated in FIG. 1.

The substitution unit 15 of FIG. 4 includes an input register 41, a multiplexer 42, S-boxes 43, a de-multiplexer 44, and an output register 45.

The input register 41 stores 16-byte input data, and the multiplexer 42 divides the 16-byte input data into 4 4-byte data and outputs each 4-byte data according to the third control signal from the control unit 18. Each byte of the 4-byte data output from the multiplexer 42 is input to each of four S-boxes 43 respectively.

The S-boxes 43 are four kinds of tables having the values specified in the ARIA algorithm, and are a storage device such as a ROM. The S-boxes 43 output data, namely, a value in the table addressed by the output value from the input register 41.

The output register 45 stores the 4-byte data output from the S-boxes 43 through the de-multiplexer 44 according to the third control signal output from the control unit 18. For this purpose, the output register 45 includes four 4-byte registers R0, R1, R2, and R3. When the most significant byte of the output register 45 is designated as a the 0th byte, and the least significant byte is designated as the 15th byte, the register R0 stores the most significant byte [0,1,2,3], the register R1 stores [4,5,6,7], the register R2 stores [8,9,10,11], and the register R3 stores the least significant byte [12,13,14,15].

The input register 41 is a 16-byte register, which stores the output of the exclusive OR operation unit 14 illustrated in FIG. 1. If the value stored in the input register is expressed in the form of In[ ], the data input to the S-boxes 43, according to the third control signal output from the control unit 18, to the multiplexer 42, and the data stored in the output register 45 for storing output values of the S-boxes 43, can be presented as follows.

TABLE 2

| Control signal | Input of S-box | | | | Output register |
|---|---|---|---|---|---|
| | S1 | S2 | S3 | S4 | |
| 000 | In[0] | In[1] | In[2] | In[3] | R0 |
| 001 | In[4] | In[5] | In[6] | In[7] | R1 |
| 010 | In[8] | In[9] | In[10] | In[11] | R2 |
| 011 | In[12] | In[13] | In[14] | In[15] | R3 |
| 100 | In[2] | In[3] | In[0] | In[1] | R0 |
| 101 | In[6] | In[7] | In[4] | In[5] | R1 |
| 110 | In[10] | In[11] | In[8] | In[9] | R2 |
| 111 | In[14] | In[15] | In[12] | In[13] | R3 |

In Table 2, In[0] denotes the most significant byte, and In[15] denotes the least significant byte.

Referring to Table 2, for example, if the third control signal is [000], the values In[0], In[01], In[02] and In[03] output from the multiplexer 42 are input to the S-boxes S1, S2, S3 and S4, respectively. The values output from the S-boxes S1 to S4 are stored in the register R0 through the de-multiplexer 44. Similarly, if the third control signal is [100], the values In[0] to In[3] output from the multiplexer 42 are input to the S-boxes S3, S4, S1, and S2, respectively. The values output from the S-boxes S1 to S4 are stored in the register R0 through the de-multiplexer 44.

According to FIG. 4 and Table 2, it is possible to reduce a circuit size of the ARIA encryption/decryption apparatus by providing only a single set of four S-boxes to operate each of the odd and even functions, unlike the conventional art in which four S-boxes should be separately provided for each of the odd and even functions.

Figure 5:
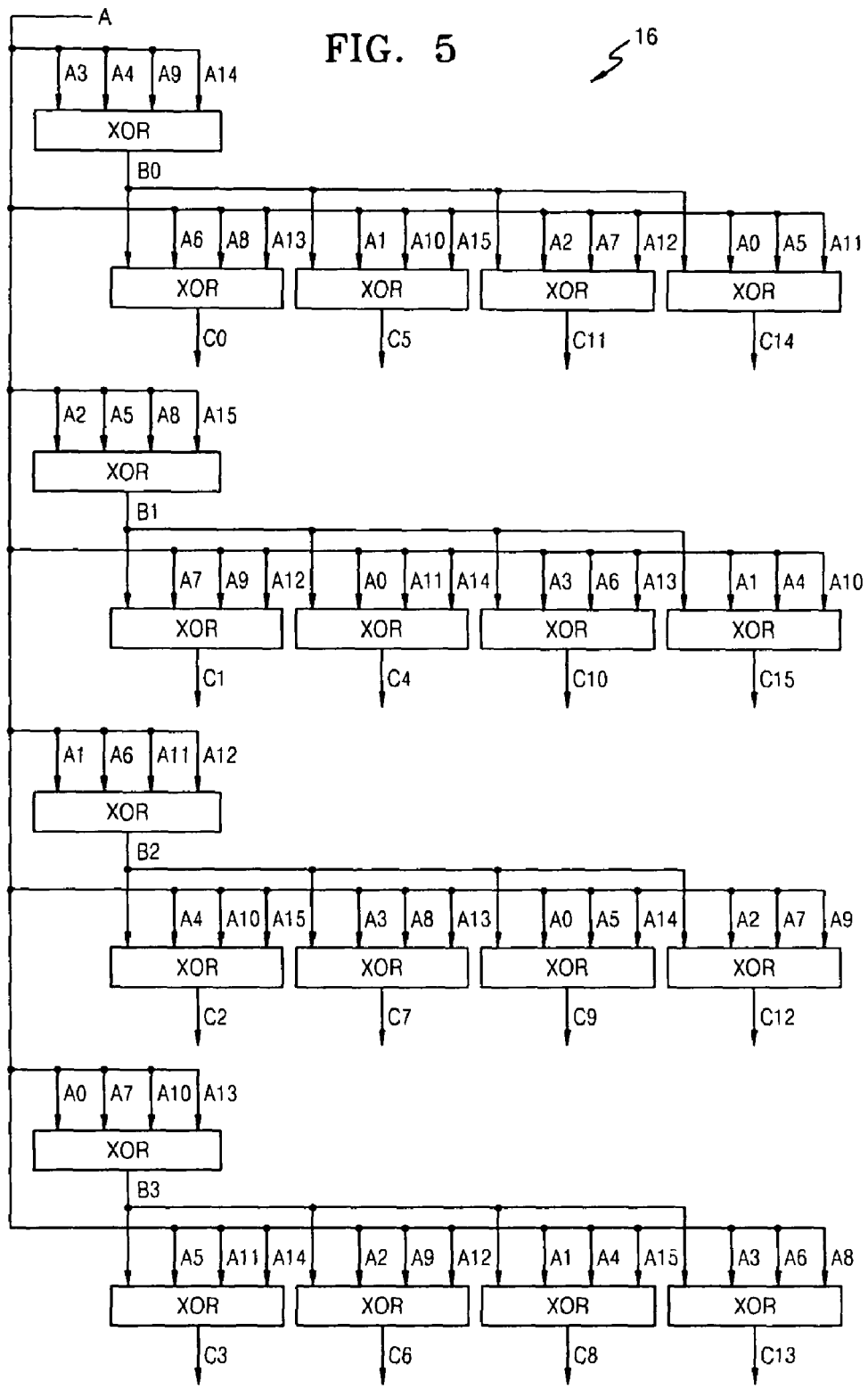
FIG. 5 is a detailed block diagram of a diffusion unit illustrated in FIG. 1.

FIG. 5 is a detailed block diagram of the diffusion unit 16 illustrated in FIG. 1.

The diffusion unit 16 shown in FIG. 5 includes a plurality of exclusive OR (XOR) operation units for receiving 16-byte input data A and outputting 16-byte output data C.

The input data A includes 16 one-byte data A0 to A15, in which A0 denotes the most significant byte, and A15 denotes the least significant byte. The output data C includes 16 one-byte data C0 to C15, in which C0 denotes the most significant byte, and C15 denotes the least significant byte. B0, B1, B2 and B3 denote one-byte intermediate calculation values. Referring to FIG. 5, a diffusion process can be described as follows.

$B0 = A3 \oplus A4 \oplus A9 \oplus A14$ $C0 = B0 \oplus A6 \oplus A8 \oplus A13$ $C5 = B0 \oplus A1 \oplus A10 \oplus A15$ $C11 = B0 \oplus A2 \oplus A7 \oplus A12$ $C14 = B0 \oplus A0 \oplus A5 \oplus A11$ $B1 = A2 \oplus A5 \oplus A8 \oplus A15$ $C1 = B1 \oplus A7 \oplus A9 \oplus A12$ $C4 = B1 \oplus A0 \oplus A11 \oplus A14$ $C10 = B1 \oplus A3 \oplus A6 \oplus A13$ $C15 = B1 \oplus A1 \oplus A4 \oplus A10$ $B2 = A1 \oplus A6 \oplus A11 \oplus A12$ $C2 = B2 \oplus A4 \oplus A10 \oplus A15$ $C7 = B2 \oplus A3 \oplus A8 \oplus A13$ $C9 = B2 \oplus A0 \oplus A5 \oplus A14$ $C12 = B2 \oplus A2 \oplus A7 \oplus A9$ $B3 = A0 \oplus A7 \oplus A10 \oplus A13$ $C3 = B3 \oplus A5 \oplus A11 \oplus A14$ $C6 = B3 \oplus A2 \oplus A9 \oplus A12$ $C8 = B3 \oplus A1 \oplus A4 \oplus A15$ $C13 = B3 \oplus A3 \oplus A6 \oplus A8$ According to the configuration of the diffusion unit 16 as shown in FIG. 5, it is possible to reduce the hardware size of the ARIA encryption/decryption apparatus in comparison with the conventional art.

According to an embodiment of the present invention, the ARIA encryption/decryption apparatus does not require a separate key initialization circuit, but can reuse the round operation unit. Therefore, it is possible to reduce a circuit size of the ARIA encryption/decryption apparatus. In addition, it is possible to reduce the circuit size of the ARIA encryption/decryption apparatus by providing a single set of four different kinds of S-boxes for the substitution. Furthermore, the ARIA encryption/decryption apparatus according to an embodiment of the present invention can perform a diffusion operation by using a smaller number of XOR operation units in comparison with the conventional art. Therefore, it is possible to further reduce the circuit size of the ARIA encryption/decryption apparatus.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An ARIA (Academy, Research Institute, and Agency) encryption/decryption apparatus for encrypting and decrypting input data by repeating a plurality of rounds, the ARIA encryption/decryption apparatus comprising:
   a first register storing input data or an intermediate calculation value according to a first control signal;

a second register storing an input round key for every round;

an exclusive OR operation unit performing an exclusive OR operation on values stored in the first and second registers;

a substitution unit substituting a result of the exclusive OR operation on a basis of an ARIA substitution algorithm;

a diffusion unit diffusing a result of the substitution in the substitution unit on a basis of an ARIA diffusion algorithm if a current round is not a final round;

a control unit outputting the first control signal so that an output of the diffusion unit is used as the intermediate calculation value if the current round is not the final round or an output of the substitution unit is used as the intermediate calculation value if the current round is the final round, and outputting an output of the exclusive OR operation unit as a result of the ARIA encryption/decryption;

a third register storing the initialization keys, wherein, in order to generate and output the initialization keys to the round key generation unit, the key generation key and the output of the diffusion unit are stored in the first register according to the first control signal, key initialization constants and initialization keys calculated in a previous round are stored in the second register according to a second control signal, the exclusive OR operation unit performs an exclusive OR operation on values stored in the first and second registers, the substitution unit performs a substitution process for the output of the exclusive OR operation, the diffusion unit performs a diffusion process the output of the substitution unit, and the control unit performs a process of repeatedly outputting the first and second control signals as many times as a number of key initialization constants, stores the output of the exclusive OR operation unit in the third register as the initialization keys and outputs the initialization keys stored in the third register to the round key generation unit when the repeatedly outputting of the first and second control signals is terminated.

2. An ARIA (Academy, Research Institute, and Agency) encryption/decryption apparatus for encrypting and decrypting input data by repeating a plurality of rounds, the ARIA encryption/decryption apparatus comprising:

a first register storing input data or an intermediate calculation value according to a first control signal;

a second register storing an input round key for every round;

an exclusive OR operation unit performing an exclusive OR operation on values stored in the first and second registers;

a substitution unit substituting a result of the exclusive OR operation on a basis of an ARIA substitution algorithm;

a diffusion unit diffusing a result of the substitution in the substitution unit on a basis of an ARIA diffusion algorithm if a current round is not a final round;

a control unit outputting the first control signal so that an output of the diffusion unit is used as the intermediate calculation value if the current round is not the final round or an output of the substitution unit is used as the intermediate calculation value if the current round is the final round, and outputting an output of the exclusive OR operation unit as a result of the ARIA encryption/decryption;

wherein the substitution unit includes:

an input register storing data input from the exclusive OR operation unit;

a plurality of S-boxes;

a multiplexer selecting an input of the S-boxes among values stored in the input register according to a third control signal;

a plurality of output registers; and a de-multiplexer summing data output from the S-boxes to output to one of the output registers according to the third control signal, and wherein the control unit further outputs the third control signal, wherein the S-boxes and the output registers store data according to the third control signal as shown in the following table and substitute the output of the exclusive OR operation unit:

TABLE

| Control signal | Output of substitution |
| --- | --- |
| 000 | In[0], In[1], In[2], In[3] |
| 001 | In[4], In[5], In[6], In[7] |
| 010 | In[8], In[9], In[10], In[11] |
| 011 | In[12], In[13], In[14], In[15] |
| 100 | In[2], In[3], In[0], In[1] |
| 101 | In[6], In[7], In[4], In[5] |
| 110 | In[10], In[11], on[8], In[9] |
| 111 | In[14], In[15], In[12], In[13] | where, In[0] denotes a most significant byte of the data stored in the input register, In [15] denotes a least significant byte of the data stored in the input register, the S-boxes include S1 to S4, and the output register includes four registers R0 to R3.

3. An ARIA (Academy, Research Institute, and Agency) encryption/decryption apparatus for encrypting and decrypting input data by repeating a plurality of rounds, the ARIA encryption/decryption apparatus comprising:

a first register storing input data or an intermediate calculation value according to a first control signal;

a second register storing an input round key for every round;

an exclusive OR operation unit performing an exclusive OR operation on values stored in the first and second registers;

a substitution unit substituting a result of the exclusive OR operation on a basis of an ARIA substitution algorithm;

a diffusion unit diffusing a result of the substitution in the substitution unit on a basis of an ARIA diffusion algorithm if a current round is not a final round;

a control unit outputting the first control signal so that an output of the diffusion unit is used as the intermediate calculation value if the current round is not the final round or an output of the substitution unit is used as the intermediate calculation value if the current round is the final round, and outputting an output of the exclusive OR operation unit as a result of the ARIA encryption/decryption;

wherein the diffusion unit includes a plurality of exclusive OR operation units for outputting data C0 to C15 satisfying the following equation,

[Equation]

$B0 = A3 \oplus A4 \oplus A9 \oplus A14$ $C0 = B0 \oplus A6 \oplus A8 \oplus A13$ $C5 = B0 \oplus A1 \oplus A10 \oplus A15$ $C11 = B0 \oplus A2 \oplus A7 \oplus A12$ $C14 = B0 \oplus A0 \oplus A5 \oplus A11$ $B1 = A2 \oplus A5 \oplus A8 \oplus A15$ $C1 = B1 \oplus A7 \oplus A9 \oplus A12$ $C4 = B1 \oplus A0 \oplus A11 \oplus A14$ $C10 = B1 \oplus A3 \oplus A6 \oplus A13$ $C15 = B1 \oplus A1 \oplus A4 \oplus A10$ $B2 = A1 \oplus A6 \oplus A11 \oplus A12$ $C2 = B2 \oplus A4 \oplus A10 \oplus A15$ $C7 = B2 \oplus A3 \oplus A8 \oplus A13$ $C9 = B2 \oplus A0 \oplus A5 \oplus A14$ $C12 = B2 \oplus A2 \oplus A7 \oplus A9$ $B3 = A0 \oplus A7 \oplus A10 \oplus A13$ $C3 = B3 \oplus A5 \oplus A11 \oplus A14$ $C6 = B3 \oplus A2 \oplus A9 \oplus A12$ $C8 = B3 \oplus A1 \oplus A4 \oplus A15$ $C13 = B3 \oplus A3 \oplus A6 \oplus A8$ where, the substitution unit outputs data A0 to A15.

4. An ARIA encryption/decryption method for encrypting and decrypting input data by repeating a plurality of rounds, the ARIA encryption/decryption method comprising:
storing input data and a first round key in first and second registers, respectively;
performing an exclusive OR operation on values stored in the first and second registers;
substituting a result of the exclusive OR operation according to a predetermined control signal;
if the current round is not the final round, diffusing the result of the substitution, storing a result of the diffusing in the first register and a next round key in the second register, and repeating the performing an exclusive OR operation and the substituting a result of the exclusive OR operation;
storing a result of the substitution in the first register and storing a next round key in the second register if a current round is a final round;
performing an exclusive OR operation on values stored in the first and second registers to output a result of the ARIA encryption/decryption;
generating initialization keys before the storing the input data and the first round key in the first and second registers, respectively; and
generating the round key in each round when the initialization keys and a key generating key are input,
wherein the generated round key is stored in the second register as the first round key,
wherein the generation of the initialization keys includes:
storing the key generation key and a first key initialization constant in the first and second registers, respectively;
performing a first exclusive OR operation on values stored in the first and second registers;
substituting a result of the first exclusive OR operation;
diffusing a result of the substitution;
storing a result of the diffusion in the first register and storing initialization keys calculated in a previous round in the second register;
performing a second exclusive OR operation on values stored in the first and second registers;
storing a result of the second exclusive OR operation in the first and third registers and storing a next key initialization constant in the second register;
repeating processes from the performing a first exclusive OR operation to the storing a next key initialization constant in the second register as many times as a number of key initialization constants; and
outputting values stored in the third register as the initialization keys.

5. An ARIA encryption/decryption method for encrypting and decrypting input data by repeating a plurality of rounds, the ARIA encryption/decryption method comprising:
storing input data and a first round key in first and second registers, respectively;
performing an exclusive OR operation on values stored in the first and second registers;
substituting a result of the exclusive OR operation according to a predetermined control signal;
if the current round is not the final round, diffusing the result of the substitution, storing a result of the diffusing in the first register and a next round key in the second register, and repeating the performing an exclusive OR operation and the substituting a result of the exclusive OR operation;
storing a result of the substitution in the first register and storing a next round key in the second register if a current round is a final round;
performing an exclusive OR operation on values stored in the first and second registers to output a result of the ARIA encryption/decryption,
wherein the substitution of the result of the exclusive OR operation is performed based on the following table,

TABLE

| Control signal | Output of substitution |
| --- | --- |
| 000 | In[0], In[1], In[2], In[3] |
| 001 | In[4], In[5], In[6], In[7] |
| 010 | In[8], In[9], In[10], In[11] |
| 011 | In[12], In[13], In[14], In[15] |
| 100 | In[2], In[3], In[0], In[1] |
| 101 | In[6], In[7], In[4], In[5] |
| 110 | In[10], In[11], on[8], In[9] |
| 111 | In[14], In[15], In[12], In[13] | where, In[0] to In[15] denote the result of the exclusive OR operation, and binary expressions [000] to [111] denote the control signals.

6. An ARIA encryption/decryption method for encrypting and decrypting input data by repeating a plurality of rounds, the ARIA encryption/decryption method comprising:
storing input data and a first round key in first and second registers, respectively;
performing an exclusive OR operation on values stored in the first and second registers;
substituting a result of the exclusive OR operation according to a predetermined control signal;
if the current round is not the final round, diffusing the result of the substitution, storing a result of the diffusing in the first register and a next round key in the second register, and repeating the performing an exclusive OR operation and the substituting a result of the exclusive OR operation;
storing a result of the substitution in the first register and storing a next round key in the second register if a current round is a final round;
performing an exclusive OR operation on values stored in the first and second registers to output a result of the ARIA encryption/decryption,
wherein data C0 to C15 satisfying the following equation are output as a result of the diffusion,

[Equation]

$B0 = A3 \oplus A4 \oplus A9 \oplus A14$ $C0 = B0 \oplus A6 \oplus A8 \oplus A13$ $C5 = B0 \oplus A1 \oplus A10 \oplus A15$ $C11 = B0 \oplus A2 \oplus A7 \oplus A12$ $C14 = B0 \oplus A0 \oplus A5 \oplus A11$ $B1 = A2 \oplus A5 \oplus A8 \oplus A15$ $C1 = B1 \oplus A7 \oplus A9 \oplus A12$ $C4 = B1 \oplus A0 \oplus A11 \oplus A14$ $C10 = B1 \oplus A3 \oplus A6 \oplus A13$ $C15 = B1 \oplus A1 \oplus A4 \oplus A10$ $B2 = A1 \oplus A6 \oplus A11 \oplus A12$ $C2 = B2 \oplus A4 \oplus A10 \oplus A15$ $C7 = B2 \oplus A3 \oplus A8 \oplus A13$ $C9 = B2 \oplus A0 \oplus A5 \oplus A14$ $C12 = B2 \oplus A2 \oplus A7 \oplus A9$ $B3 = A0 \oplus A7 \oplus A10 \oplus A13$ $C3 = B3 \oplus A5 \oplus A11 \oplus A14$ $C6 = B3 \oplus A2 \oplus A9 \oplus A12$ $C8 = B3 \oplus A1 \oplus A4 \oplus A15$ $C13 = B3 \oplus A3 \oplus A6 \oplus A8$ where, $\oplus$ denotes the exclusive OR operation, and A0 to A15 denote output data of the substitution.

7. A method of generating initial keys for an ARIA encryption/decryption, the method comprising:
storing a key generation key and a first key initialization constant in the first and second registers, respectively;
performing a first exclusive OR operation on values stored in the first and second registers;
substituting a result of the first exclusive OR operation;
diffusing a result of the substitution;
storing a result of the diffusion and initial keys calculated in a previous round in the first and second registers, respectively;
performing a second exclusive OR operation for values stored in the first and second registers;
storing a result of the second exclusive OR operation in the first and third registers and storing a next key initialization constant in the second register;
repeating processes from the performing a first exclusive OR operation to the storing a next key initialization constant in the second register as many times as a number of key initialization constants; and
outputting values stored in the third register as the initialization keys.

8. The method of claim 7, wherein the substitution is performed on the basis of the following table,

TABLE

| Control signal | Output of substitution |
| --- | --- |
| 000 | In[0], In[1], In[2], In[3] |
| 001 | In[4], In[5], In[6], In[7] |
| 010 | In[8], In[9], In[10], In[11] |
| 011 | In[12], In[13], In[14], In[15] |
| 100 | In[2], In[3], In[0], In[1] |
| 101 | In[6], In[7], In[4], In[5] |
| 110 | In[10], In[11], on[8], In[9] |
| 111 | In[14], In[15], In[12], In[13] | where, In[0] to In[15] denote the result of the exclusive OR operation, and binary expressions [000] to [111] denote the control signals.

9. The method of claim 7, wherein data C0 to C15 satisfying the following equation are output as a result of the diffusion,

[Equation]

$B0 = A3 \oplus A4 \oplus A9 \oplus A14$ $C0 = B0 \oplus A6 \oplus A8 \oplus A13$ $C5 = B0 \oplus A1 \oplus A10 \oplus A15$ $C11 = B0 \oplus A2 \oplus A7 \oplus A12$ $C14 = B0 \oplus A0 \oplus A5 \oplus A11$ $B1 = A2 \oplus A5 \oplus A8 \oplus A15$ $C1 = B1 \oplus A7 \oplus A9 \oplus A12$ $C4 = B1 \oplus A0 \oplus A11 \oplus A14$ $C10 = B1 \oplus A3 \oplus A6 \oplus A13$ $C15 = B1 \oplus A1 \oplus A4 \oplus A10$ $B2 = A1 \oplus A6 \oplus A11 \oplus A12$ $C2 = B2 \oplus A4 \oplus A10 \oplus A15$ $C7 = B2 \oplus A3 \oplus A8 \oplus A13$ $C9 = B2 \oplus A0 \oplus A5 \oplus A14$ $C12 = B2 \oplus A2 \oplus A7 \oplus A9$ $B3 = A0 \oplus A7 \oplus A10 \oplus A13$ $C3 = B3 \oplus A5 \oplus A11 \oplus A14$ $C6 = B3 \oplus A2 \oplus A9 \oplus A12$ $C8 = B3 \oplus A1 \oplus A4 \oplus A15$ $C13 = B3 \oplus A3 \oplus A6 \oplus A8$ where, $\oplus$ denotes the exclusive OR operation, and A0 to A15 denote output data of the substitution.

* * * * *